United States Patent
Thumm

Patent Number: 5,168,614
Date of Patent: Dec. 8, 1992

[54] TOOL TURRET

[75] Inventor: Helmut Thumm, Metzingen, Fed. Rep. of Germany

[73] Assignee: Sauter Feinmechanik GmbH, Fed. Rep. of Germany

[21] Appl. No.: 711,137

[22] Filed: Jun. 6, 1991

[30] Foreign Application Priority Data

Jun. 9, 1990 [DE] Fed. Rep. of Germany ....... 4018543

[51] Int. Cl.$^5$ ............................................. B23B 39/20
[52] U.S. Cl. ........................................ 29/40; 408/35; 408/56
[58] Field of Search ...................... 409/201, 211, 230; 408/35, 56; 29/35.5, 39, 40, 42, 48.5 R, 48.5 A

[56] References Cited

U.S. PATENT DOCUMENTS

| | | | |
|---|---|---|---|
| 3,717,417 | 2/1973 | Aubrier | 408/35 |
| 4,090,281 | 5/1978 | Hautau | 408/35 |
| 4,704,926 | 11/1987 | Boffelli | 408/35 |
| 4,785,513 | 11/1988 | Lee et al. | 408/35 |
| 4,872,244 | 10/1989 | Schleich | 29/40 |

FOREIGN PATENT DOCUMENTS

| | | | |
|---|---|---|---|
| 2103741 | 8/1972 | Fed. Rep. of Germany | 408/35 |
| 2346628 | 3/1976 | Fed. Rep. of Germany | |
| 3730561 | 11/1988 | Fed. Rep. of Germany | |
| 297005 | 12/1986 | Japan | 408/35 |

Primary Examiner—Daniel W. Howell
Attorney, Agent, or Firm—Wigman & Cohen

[57] ABSTRACT

A hollow column is provided for a tool turret with a housing that is to be connected to a machine tool or the like, with a drive motor, and with a tool disc which has receptacles for tools, the tool disc being mounted rotatably relative to the housing and being lockable in selectable angular positions. The hollow column is nonmoveable relative to the housing. A shaft which extends in the longitudinal direction of the column, and which can be driven by the drive motor is disposed within the hollow column. That tool, which is inserted into the receptacle that is situated in the working position, can be driven by the shaft. At least one line is provided in the column so as to be part of a system provided for the transfer of energy, lubricant, coolant, pressure or the like.

16 Claims, 1 Drawing Sheet

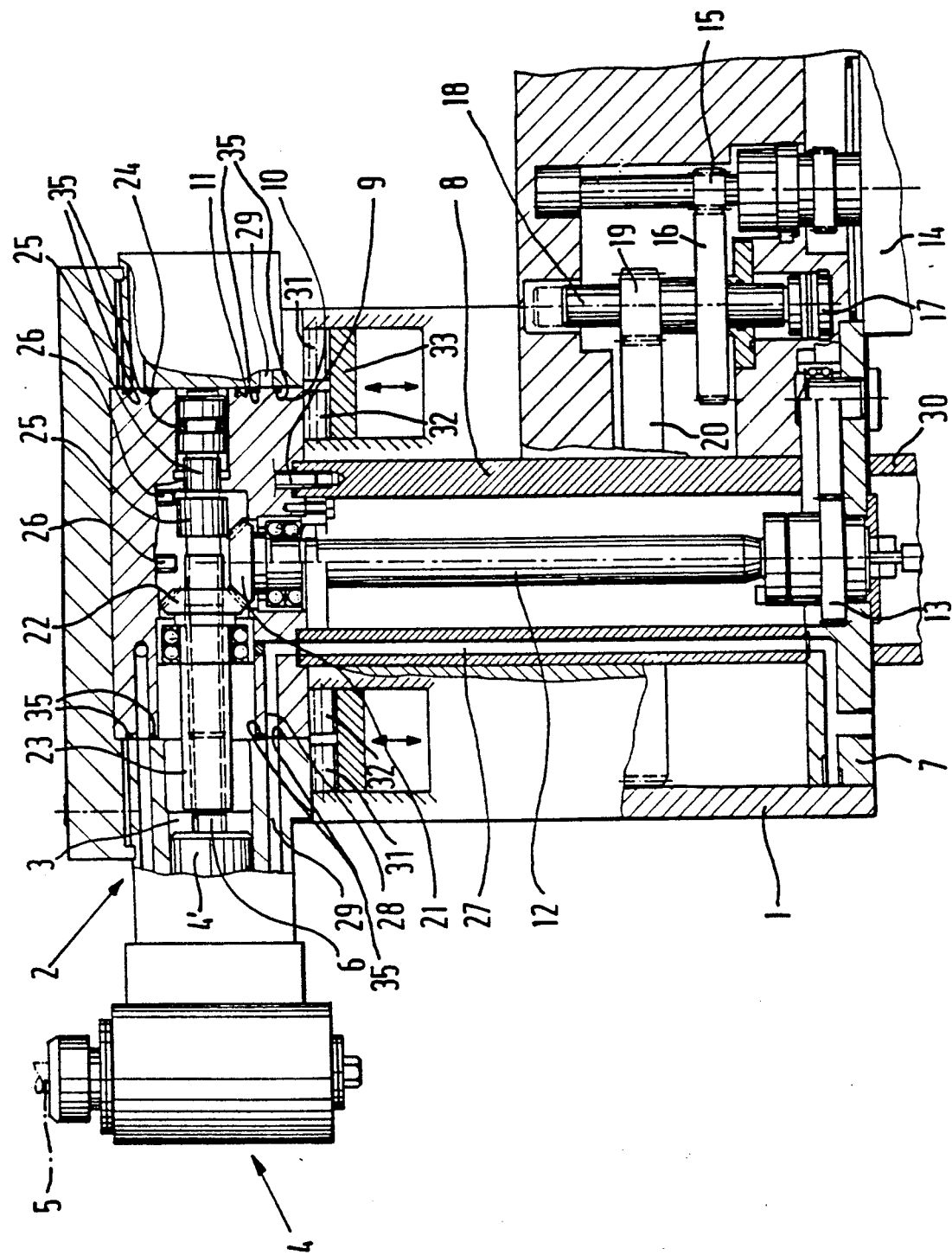

TOOL TURRET

BACKGROUND OF THE INVENTION

1. Field of the Invention

The invention relates to a tool turret and more particularly a tool turret connected to a motor driven machine tool which includes a rotatable tool disc for receiving tools.

2. Description of the Prior Art

It is known how to position a drive motor at the housing in such a fashion, at a radial distance from the axis of rotation of the tool disc, that a coupling shaft driven by this motor can be coupled to the drive shaft of that tool module which is inserted into the receptacle of the tool disc which is situated in the working position.

Furthermore, it is known that a drive shaft can be rotatably mounted in a hollow shaft, by means of which the tool disc can be turned relative to the housing. By means of a gear disposed in the tool disc, this drive shaft drives either all the modules with the rotating tool, or only the module situated in the working position.

If a drive motor for rotating tools is disposed at a radial distance from the axis of rotation of the tool disc, this is troublesome in many cases not only for reasons of space, but also because it increases the cost since it must be present in addition to the motor that is required to turn the tool disc. When the tools are driven by way of a shaft that is mounted in the hollow shaft which turns the tool disc, the tool disc can be turned and the tool can be driven by one and the same motor. However, this construction is structurally expensive and in particular makes it difficult to apply lubricants, coolants, or fluidic auxiliary energy to the tool disc.

OBJECTS AND SUMMARY OF THE INVENTION

It is therefore an object of the present invention to provide a tool turret which makes it possible, in simple and economical fashion, to supply the auxiliary energies or auxiliary means that are required by the tool modules, the tools, or also by the tool disc.

The hollow column, which is immovable relative to the housing of the tool turret, makes it possible in optimal fashion to supply all the auxiliary energies, lubricants, and the like that are needed in the area of the tool disc and of the tools. What is involved here is not only a lead-through through the duct formed by the hollow column, but also a lead-through in ducts which are located in the wall of the column. The latter possibility permits an extremely space-saving design of the hollow column. Furthermore, the transport of energy or fluids in the hollow column or in ducts therein also does not create problems at the ends of the ducts, because the hollow column is immovable relative to the housing of the tool turret.

In a preferred embodiment, a head is provided at that end of the column which is situated near the tool disc. The tool disc has a receptacle that is concentric with the rotation axis, and the head of the column engages this receptacle. Thus, an exterior sheath surface of the head and an interior sheath surface of the central receptacle of the tool disc are situated opposite one another. As a result, sealed transitions for transporting auxiliary energies and auxiliary substances can be implemented without any problem. If driving energy must be transmitted to at least one of the receptacles of the tool disc for tools or tool modules, then the head advantageously contains at least one gear element and one switching device, through which a shaft can be coupled to the tool that is situated in the working position. The switching device makes it possible to limit the transmission of driving energy to that receptacle of the tool disc which is situated in the working position, and to activate this drive only if the tool situated in this receptacle is a rotating tool.

An advantageous design of the switching device comprises a slideable shaft which extends radially with respect to the axis of rotation of the tool disc. The fluid required for a working cylinder or the electrical energy which is needed for an electromagnet is conducted to the head through the hollow column. That end of the hollow column which faces away from the head is preferably coupled to the housing directly or indirectly.

BRIEF DESCRIPTION OF A PREFERRED EMBODIMENT

The invention is explained in more detail below, by way of an embodiment shown in the drawing. The sole figure shows an incomplete, partially exploded view of the preferred embodiment.

DETAILED DESCRIPTION OF A PREFERRED EMBODIMENT

As shown in the drawing, according to the present invention the tool turret has a housing 1 which can be fixed on a machine tool, for example, a carriage. A tool disc 2, rotatable with respect to the housing 1, is disposed on one end of said housing. Along its circumference, tool disc 2 has uniformly distributed receptacles 3 for tools or tool modules 4, which may include a rotating tool 5. In the preferred embodiment, the receptacles 3 comprise openings which extend in the radial direction. A coupling pin 4' of the tool module 4 can be inserted into each of these holes. A coupling shaft 6, whose contour differs from a circular shape, protrudes beyond the coupling pin 4'. Coupling shaft 6 is connected to the rotatably mounted mount for the tool 5, via an angular gear. Also contemplated are modules with a tool situated parallel to the longitudinal axis of the coupling pin 4'. Modules which carry a stationary tool can also be inserted into the receptacles 3.

Housing 1 is sealed by an end plate 7 at its end which faces away from the tool disc 2. One end of a hollow column 8, disposed concentrically with respect to the rotation axis of the tool disc 2, is situated at the inside surface of the end plate 7. It is rigidly connected to the end plate 7, for example, by means of screws. The other end of the hollow column 8 is rigidly connected to a cylindrical head 10, for example, by means of screws 9. The head 10 is disposed concentrically to the column 8. The head 10 is inserted completely into a central receptacle 11 of the tool disc 2, and this receptacle is matched to the outside dimensions of the head 10. Consequently, when the tool disc 2 rotates, it rotates about the head 10.

For manufacturing reasons, the tool disc 2 in the embodiment consists of an annular disc, whose thickness is somewhat less than the axial length of the head 10, and of a cylindrical plate screwed together with this annular disc, into which extend the central recess 11 and consequently the head 10.

One end of a connection shaft 12, disposed in the longitudinal axis of the column 8, is mounted in the head 10, concentrically with respect to the column 8. The other end is mounted in the end plate 7. Here, a spur wheel 13 is rigidly disposed on the connection shaft. The spur wheel 13 is connected to a drive motor 14 by way of other spur wheels. Drive motor 14 is also used to turn the tool disc 2 relative to the housing 1 and the head 10. A spur-toothed gear wheel 16, which engages a pinion gear 15 on the motor shaft, is therefore disposed on a gear shaft 18, which can be moved axially by means of a piston 17. The gear shaft 18 also carries a pinion gear 19, which engages a gear wheel 20 that must be driven for the rotational motion of the tool disc. When the piston 17 is in the position shown in the drawing, the tool disc 2 can be turned in one or the other direction of rotation by means of the drive motor 14. If the drive motor 14 is supposed to drive only the tool 5, then the double-action piston 17 moves the gear shaft 18 into the position which is shown with dots and dashes in the area of its free end. In this position, the gear wheel 16 does not engage the pinion gear 15. The end of the connection shaft 12 is mounted in the tool disc 2 and carries a bevel wheel 21 which engages a second bevel wheel 22. The latter is mounted non-rotatably, but movably along the axial direction, on a drive shaft 23 which is mounted rotatably and movable radially in the tool disc 4. By means of a double-action piston 24, the drive shaft 23 can be brought from a position, in which its end facing away from the piston 24 does not protrude over the exterior sheath surface of the head 10, into a position in which this end engages that receptacle 3 of the tool disc 2 which is situated in the working position. The drive shaft 23 has a central hole in this end section, and the inside profile of this hole is matched to the outside profile of the coupling shaft 6. Thus, the drive shaft 23 can be attached to that end of the coupling shaft 6 which protrudes beyond the pin 4' resulting in a coupled connection. For reasons of clarity, the drawing shows a position of the drive shaft 23, in which the drive shaft is not pushed over the coupling shaft 6.

A sensor body 25 is rigidly disposed on the drive shaft 23 between the piston 24 and the second bevel wheel 22. Two sensors 26 are disposed at the displacement path of the sensor body 25. For example, these sensors 26 can be designed as proximity switches. The position of the drive shaft 23 is monitored by means of the sensor body 25 and the two sensors 26.

The conduits for the pressure means which lead to the piston 24, as well as the signal lines of the sensors 26, pass through the hollow column 8 in a manner that is not shown.

Hollow column 8 can also contain lines which carry coolant fluid for the tools or lubricants. Furthermore, column 8 can also contain, for example, lines for a pressure means, by means of which clamping equipment is activated, which solidly clamps the coupling pin 4' in the receptacle 3 which receives it. In the embodiment, not all the lines are conducted through the inside space of column 8. Rather, the wall of column 8 has holes drilled through it in the longitudinal direction so as to form a conduit 27, which joins conduit 28 in the head 10. Conduit 28 extends radially to the outside sheath surface and is sealed by seals 35 to the radially directed hole 29 of the receptacle 3, which is situated in the working position. Naturally, other such lines can be provided, and radial holes can adjoin one another displaced in the axial direction, both in the head 10 and in the receptacles 3. In the preferred embodiment, a protective housing 30 connects to the outside of the end plate 7. A rotary transducer is located in the protective housing 30.

Two gear rings 31 and 32 concentric with respect to one another, are positioned in the interior of the housing 1, in well-known fashion. One of the gear rings is rigidly associated with the tool disc 2 and the other is rigidly associated with the housing 1. If the tool disc 2 is situated in one of the selectable positions, and if it is locked in this position, a gear ring provided at the locking element 33 simultaneously engages the two concentric gear wheels. Before the tool disc 2 can be brought into another rotational position, the locking element 33 therefore must first be removed into its release position. Only then, by rotating the gear wheel 20, can the rotary motion of a driving element, which is rotatably mounted in the housing 1, be transferred to the tool disc 2. One of the well known designs can be used to activate the locking element and the rotary drive of the tool disc 2.

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. A tool turret having a housing to be connected to a machine tool which includes a drive motor comprising:
   a tool disc which has receptacles for tools, the tool disc being rotatably mounted relative to the housing,
   means for locking said tool disc in selectable angular positions, and
   a hollow column immovable relative to the housing in which column is provided a longitudinally extending shaft driveable by the drive motor, said shaft adapted to drive said tool.

2. A tool turret having a housing to be connected to a machine tool which includes a drive motor comprising:
   a tool disc which has receptacles for tools, the tool disc being rotatably mounted relative to the housing,
   means for locking said tool disc in selectable angular positions,
   a hollow column having a wall and immovable relative to the housing, in which column at least one line is provided in said wall, for transferring at least one member of the group consisting of energy, lubricant, coolant and pressure.

3. The tool turret according to claim 1 wherein at least one line is provided in said hollow column for transferring at least one member of the group consisting of energy, lubricant, coolant and pressure.

4. The tool turret according to claim 2 wherein in said hollow column is provided a longitudinally extending shaft driveable by the drive motor, said shaft adapted to drive said tool.

5. The tool turret according to claims 1, 2, 3 or 4 including a head at that end of the hollow column near the tool disc, said tool disc including a recess that is concentric with respect to a rotation axis thereof such that the head of the hollow column engages the recess.

6. The tool turret according to claim 5, wherein said head includes gear means through which a drive shaft can be coupled to the driveable tool which is positioned in a working position and a switching device for engaging and disengaging said gear means, said drive shaft and said driveable tool.

7. The tool turret according to claim 6, wherein the switching device has a slide shaft which extends radially with respect to the rotation axis of the tool disc, said slide shaft being aligned with respect to that receptacle of the tool disc which is situated in the working position for every selectable angular position of the tool disc, and which can be coupled to the tool drive, and wherein a drive means selected from the group consisting of a working cylinder and an electromagnet, likewise disposed in the head, is associated with the slide shaft and acts as an activation element.

8. The tool turret according to claim 7, wherein the head has at least one opening which discharges into an outside sheath surface, and which is connected to the line that is provided in the column, and which, in the selectable angular positions of the tool disc, can be aligned with respect to one of the lines in an inside sheath surface of the tool disc which faces the outside sheath surface of the head, and which discharges in the area of the receptacles, and also has a sealed connection with the latter.

9. The tool turret according to claims 1, 2 and 3 or 4, wherein the end of the hollow column which faces away from the head is connected to the housing.

10. The tool turret according to claim 5, wherein the end of the hollow column which faces away from the head is connected to the housing.

11. The tool turret according to claim 6, wherein the end of the hollow column which faces away from the head is connected to the housing.

12. The tool turret according to claim 7, wherein the end of the hollow column which faces away from the head is connected to the housing.

13. A tool turret having a housing to be connected to a machine tool which includes a drive motor comprising:
 a tool disc which has receptacles for tools, the tool disc being rotatably mounted relative to the housing and being lockable in selectable angular positions, said tool disc including a recess that is concentric with respect to a rotation axis thereof, said tool disc recess having an inside sheath surface;
 a hollow column in the housing and immovable relative to the housing, said hollow column having a wall and a cavity and including a head at that end near the tool disc, said head engaging said recess of said tool disc,
 a longitudinally extending shaft driveable by the drive motor being positioned such that the tool can be driven by said shaft, and
 at least one line provided for transferring at least one member of the group consisting energy, lubricant, coolant and pressure, said line located in one of the group consisting of said column wall and said column cavity,
 said head having an outside sheath surface and at least one opening which discharges into said outside sheath surface, and which is connected to the line that is provided in the column, and which, in the selectable angular positions of the tool disc, can be aligned with respect to one of the lines in said inside sheath surface of the tool disc which faces an outside sheath surface of the head, and which discharges in the area of the receptacles, and also has a sealed connection with said line of the tool disc.

14. The tool turret according to claim 13, wherein said hollow column has an end facing away from said head and being connected to the housing.

15. A tool turret having a housing to be connected to a machine tool which includes a drive motor comprising:
 a tool disc which has receptacles for tools, the tool disc being rotatably mounted relative to the housing and being lockable in selectable angular positions, said tool disc including a recess that is concentric with respect to a rotation axis thereof, said tool disc recess having an inside sheath surface,
 a hollow column in the housing and immovable relative to the housing, said hollow column having a wall and a cavity and including a head at that end near the tool disc, said head having an outside sheath surface and said head engaging said recess of said tool disc, wherein said head includes gear means and a switching device through which a shaft can be coupled to the driveable tool which is positioned in the working position;
 a longitudinally extending shaft driveable by the drive motor being positioned such that the tool can be driven by said shaft, and
 at least one line is provided for transferring at least one member of the group consisting of energy, lubricant, coolant and pressure, said line located in one of the group consisting of said column wall and said column cavity, wherein the head has at least one opening which discharges into said outside sheath surface thereof, and which is connected to the line that is provided in the column, and which in the selectable angular positions of the tool disc, can be aligned with respect to one of the liens in said inside sheath surface of the tool disc which faces said outside sheath surface of the head, and which discharges in the area of the receptacles, and also has a sealed connection with said line of the tool disc.

16. The tool turret according to claim 15, wherein the switching device has a slide shaft which extends radially with respect to the rotation axis of the tool disc, said slide shaft being aligned with respect to that receptacle of the tool disc which is situated in the working position for every selectable angular position of the tool disc, and which can be coupled to the tool drive, and wherein a drive means selected from the group consisting of a working cylinder and an electromagnet, likewise disposed in the head, is associated with the slide shaft and acts as an activation element.

* * * * *